(12) United States Patent
Shimada et al.

(10) Patent No.: US 10,461,553 B2
(45) Date of Patent: Oct. 29, 2019

(54) POWER SOURCE DEVICE

(71) Applicant: HITACHI AUTOMOTIVE SYSTEMS, LTD., Hitachinaka-shi, Ibaraki (JP)

(72) Inventors: Takae Shimada, Tokyo (JP); Hiroyuki Shoji, Tokyo (JP); Takayuki Oouchi, Tokyo (JP); Fumihiro Sato, Tokyo (JP); Kenji Kubo, Hitachinaka (JP); Eigo Kishimoto, Hitachinaka (JP)

(73) Assignee: HITACHI AUTOMOTIVE SYSTEMS, LTD., Hitachinaka-Shi, Ibaraki (JP)

(*) Notice: Subject to any disclaimer, the term of this patent is extended or adjusted under 35 U.S.C. 154(b) by 165 days.

(21) Appl. No.: 15/301,613

(22) PCT Filed: Mar. 16, 2015

(86) PCT No.: PCT/JP2015/057614
§ 371 (c)(1),
(2) Date: Oct. 3, 2016

(87) PCT Pub. No.: WO2015/163035
PCT Pub. Date: Oct. 29, 2015

(65) Prior Publication Data
US 2017/0117731 A1    Apr. 27, 2017

(30) Foreign Application Priority Data

Apr. 23, 2014 (JP) .................................. 2014-088685

(51) Int. Cl.
*H02J 7/00* (2006.01)
*H02J 7/14* (2006.01)
(Continued)

(52) U.S. Cl.
CPC ............ *H02J 7/0052* (2013.01); *B60L 53/22* (2019.02); *H02J 1/102* (2013.01); *H02J 7/022* (2013.01);
(Continued)

(58) Field of Classification Search
USPC ....... 320/107, 108, 109, 128, 116, 103, 134, 320/140, 162
See application file for complete search history.

(56) References Cited

U.S. PATENT DOCUMENTS

| 6,297,616 B1 * | 10/2001 | Kubo ..................... H02J 7/0027 320/116 |
| 7,081,734 B1 * | 7/2006 | Jadric ................... H02M 7/797 318/767 |

(Continued)

FOREIGN PATENT DOCUMENTS

| JP | 2006-101668 A | 4/2006 |
| JP | 2011-50227 A | 3/2011 |

(Continued)

*Primary Examiner* — Alexis B Pacheco
(74) *Attorney, Agent, or Firm* — Foley & Lardner LLP

(57) ABSTRACT

Provided is a power source device having a high efficiency. A power source device 1 includes an insulated AC-DC converter 2 which receives a voltage of an AC power source 10 and outputs a link voltage Vlink, a bidirectional DC-DC converter 3 which receives the link voltage Vlink to charge a main battery 5, an insulated DC-DC converter 4 which receives the link voltage Vlink to supply power to a load 7, an operation mode in which the power is supplied from the AC power source 10 to the main battery 5, and an operation mode in which the power is supplied from the main battery 5 to the load 7.

20 Claims, 8 Drawing Sheets

(51) Int. Cl.
  *H02M 3/155* (2006.01)
  *H02M 3/28* (2006.01)
  *H02M 3/335* (2006.01)
  *H02M 7/12* (2006.01)
  *H02M 7/219* (2006.01)
  *H02M 3/158* (2006.01)
  *H02M 7/217* (2006.01)
  *H02J 1/10* (2006.01)
  *H02J 7/02* (2016.01)
  *B60L 53/22* (2019.01)
  *H02M 1/00* (2006.01)

(52) U.S. Cl.
  CPC ........... *H02M 3/155* (2013.01); *H02M 3/158* (2013.01); *H02M 3/28* (2013.01); *H02M 3/335* (2013.01); *H02M 3/33507* (2013.01); *H02M 7/12* (2013.01); *H02M 7/217* (2013.01); *H02M 7/219* (2013.01); *B60L 2210/10* (2013.01); *B60L 2210/30* (2013.01); *B60Y 2200/91* (2013.01); *B60Y 2400/112* (2013.01); *H02J 2007/0059* (2013.01); *H02M 2001/007* (2013.01); *H02M 2001/008* (2013.01); *Y02T 10/7005* (2013.01); *Y02T 10/7072* (2013.01); *Y02T 10/7216* (2013.01); *Y02T 10/7241* (2013.01); *Y02T 10/92* (2013.01); *Y02T 90/127* (2013.01); *Y02T 90/14* (2013.01)

(56) References Cited

U.S. PATENT DOCUMENTS

| | | | |
|---|---|---|---|
| 2007/0063668 A1* | 3/2007 | Schnetzka | H02J 9/062 318/812 |
| 2008/0259666 A1 | 10/2008 | Eguchi et al. | |
| 2012/0086399 A1* | 4/2012 | Choi | H02J 7/0016 320/116 |
| 2012/0153717 A1* | 6/2012 | Obayashi | B60L 11/1816 307/9.1 |
| 2013/0141024 A1* | 6/2013 | Wu | H02P 6/18 318/400.14 |
| 2014/0049990 A1* | 2/2014 | Limpaecher | H02M 3/24 363/15 |
| 2014/0084862 A1* | 3/2014 | Kawaguchi | H02J 7/0052 320/108 |
| 2015/0073610 A1* | 3/2015 | Schnetzka | G05B 15/02 700/287 |
| 2015/0236589 A1* | 8/2015 | Baba | H02M 3/158 307/82 |
| 2015/0318803 A1* | 11/2015 | Wu | F02M 25/0836 318/400.09 |

FOREIGN PATENT DOCUMENTS

| | | | |
|---|---|---|---|
| JP | 2011-172400 A | | 9/2011 |
| JP | 2012-85378 A | | 4/2012 |
| JP | 2012085378 A | * | 4/2012 |
| JP | 2012-200064 A | | 10/2012 |
| WO | WO 2013/09918 A1 | | 7/2013 |

\* cited by examiner

POWER SOURCE DEVICE

TECHNICAL FIELD

The present invention relates to a power source device which receives an AC voltage to charge a battery.

BACKGROUND ART

In recent years, wider use of an electric vehicle and a plugin hybrid vehicle is desired due to growing global environmental consciousness. In these vehicles, a main battery is mounted to supply power to motors while the vehicle is running. In order to safely charge the main battery with lesser power when being charged from a commercial AC power source, there is a need to mount a power source device which has a function of insulating the commercial power from the main battery. The power source device is required to achieve a high conversion efficiency. PTL 1 discloses a resonance charging device which is provided with an AC-DC converter and a resonance DC-DC converter, and aimed at improvement in conversion efficiency by increasing an input voltage of the resonance DC-DC converter as well as an increase of a battery voltage.

In addition, in these vehicles, an insulated DC-DC converter is mounted to supply power from the main battery to accessory system loads of electrical components while the vehicle is running.

CITATION LIST

Patent Literature

PTL 1: JP 2012-85378 A

SUMMARY OF INVENTION

Technical Problem

It is desirable that the main battery be charged at a maximum power allowed to be input in order to fully charge the main battery in a short time. Therefore, a current capacity of the resonance DC-DC converter easily becomes large in the resonance charging device disclosed in PTL 1 since the charging current becomes large on a condition that the main battery has a low voltage.

In general, the insulated DC-DC converter easily becomes less efficient when the input voltage range is set to be wide. Therefore, in a case where an operational voltage range of the main battery is wide, it becomes difficult to make the insulated DC-DC converter have high efficiency.

An object of the present invention is to provide a power source device which receives an AC voltage and has a high efficiency for charging the battery.

Solution to Problem

In order to achieve the above object, a power source device according to the present invention includes: an insulated AC-DC converter that receives an AC voltage and outputs a DC link voltage; and a bidirectional DC-DC converter that receives the link voltage to charge a battery, and receives the charged power to output the link voltage.

Advantageous Effects of Invention

According to the invention, it is possible to provide a power source device which receives an AC voltage and has a high efficiency for changing a battery.

DESCRIPTION OF EMBODIMENTS

Hereinafter, embodiments of the invention will be described with reference to the drawings.

First Embodiment

Figure 1:
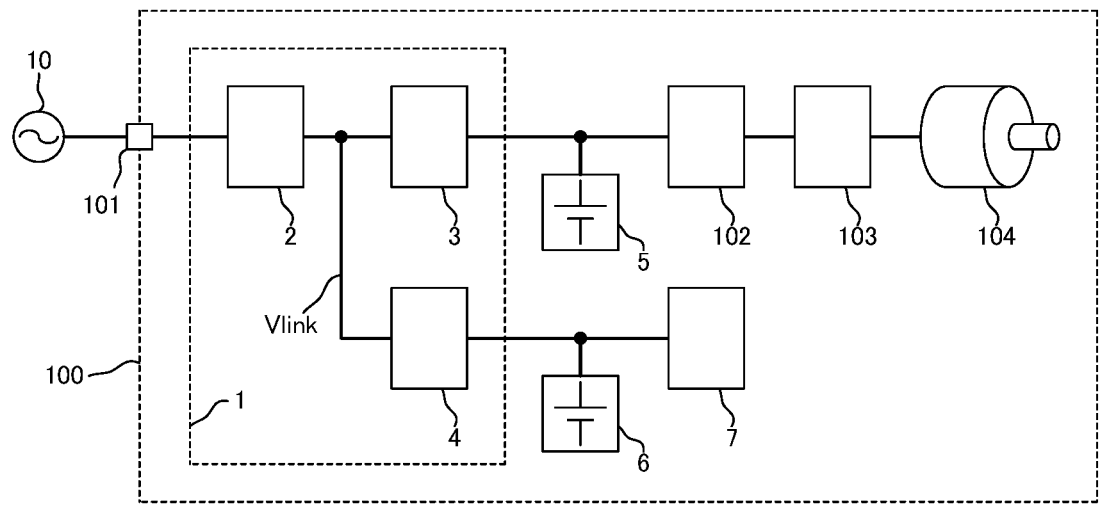
FIG. 1 is a diagram schematically illustrating a power source device 1 according to a first embodiment and a power source system of an electric vehicle 100 employing the power source device.

FIG. 1 is diagram schematically illustrating a configuration of a power source device 1 according to this embodiment, and a power source system of an electric vehicle 100 employing the power source device. The power source device 1 is connected to a charging connector 101 which is connected to an AC power source 10, a main battery 5 which is connected to a converter 102 for supplying power to an inverter 103 driving a drive motor 104, and a load 7 which is connected to an accessory system low-voltage battery 6.

The power source device 1 receives the power of the AC power source 10, and includes an insulated AC-DC converter 2 which outputs a link voltage Vlink insulated from the AC power source 10, a bidirectional DC-DC converter 3 which receives the link voltage Vlink to charge the main battery 5, and an insulated DC-DC converter 4 which receives the link voltage Vlink to supply the power to the load 7.

Figure 2:
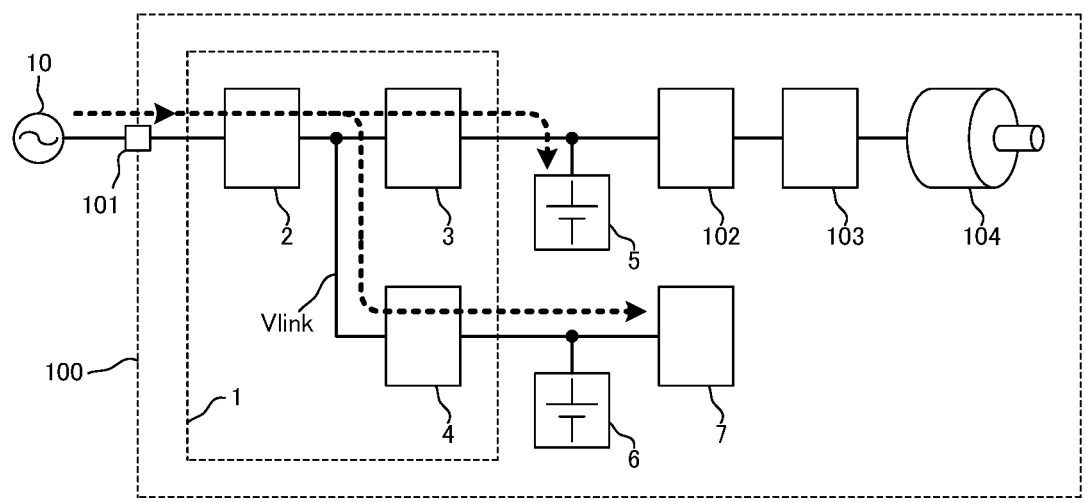
FIG. 2 is a diagram for describing a power flow of the electric vehicle 100 and the power source device 1 at the time of charging according to the first embodiment.

The following is the description about a power flow of the power source device 1 and the electric vehicle 100 at the time of charging, with reference to FIG. 2. At the time of charging, the insulated AC-DC converter 2 receives the power of the AC power source 10 to output the link voltage Vlink, and the bidirectional DC-DC converter 3 receives the link voltage Vlink to charge the main battery 5. In addition, in a case where the load 7 consumed the power, the power is supplied from the link voltage Vlink to the load 7 by operating the insulated DC-DC converter 4. In this way, at the time of charging, the main battery 5 is charged and the power is supplied to the load 7 using the power of the AC power source 10.

Figure 3:
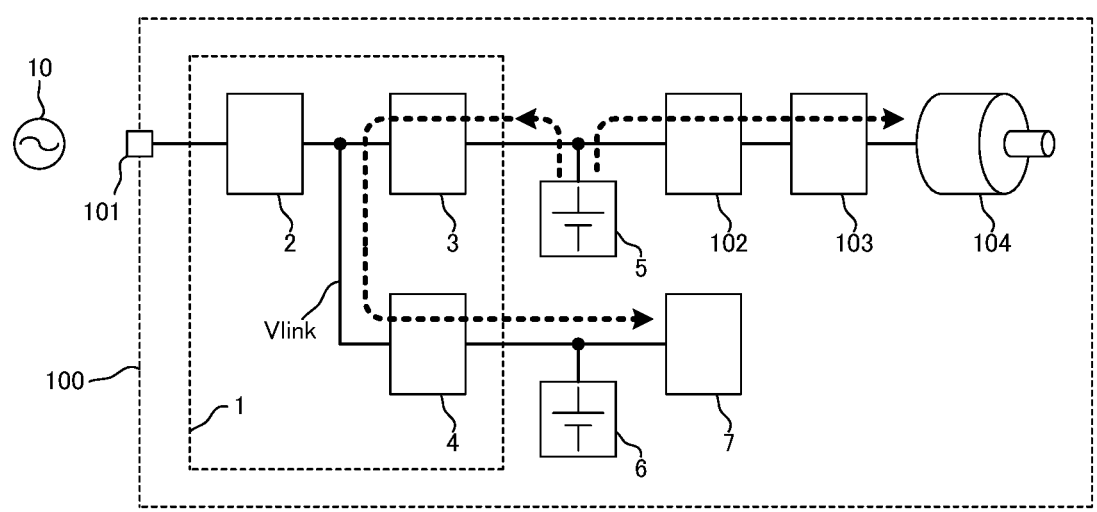
FIG. 3 is a diagram for describing a power flow of the power source device 1 and the electric vehicle 100 while the vehicle is running according to the first embodiment.

The following is the description about the power flow of the power source device 1 and the electric vehicle 100 while the vehicle is running, with reference to FIG. 3. While the vehicle is running, the power is supplied from the main battery 5 to the drive motor 104 through the converter 102 and the inverter 103. The bidirectional DC-DC converter 3 receives the power of the main battery 5 to output the link voltage Vlink, and the power is supplied from the link voltage Vlink to the load 7 by operating the insulated DC-DC converter 4. In this way, while the vehicle is running, the power is supplied to the load 7 using the power of the main battery 5.

As described above, the power source device 1 of this embodiment includes the bidirectional DC-DC converter 3 between the link voltage Vlink and the main battery 5. With this configuration, even in a case where a voltage range of the main battery 5 is wide, a voltage range of the link voltage Vlink can be made narrower than that of the main battery 5.

At the time of charging in the conventional power source device having no bidirectional DC-DC converter 3, the insulated AC-DC converter outputs the voltage of the main battery 5. In general, the efficiency of the converter is easily lowered when the input voltage range is wide, and also the cost is easily increased. Therefore, in a case where the voltage of the main battery 5 is wide, the output voltage range of the insulated AC-DC converter becomes wide. Accordingly, there is a problem in that the efficiency of the insulated AC-DC converter at the time of charging is easily lowered, and also the cost is easily increased.

In addition, the voltage of the main battery 5 becomes the input voltage of the insulated DC-DC converter while the vehicle is running. Therefore, in a case where the voltage range of the main battery 5 is wide, the input voltage range of the insulated DC-DC converter becomes wide. Accordingly, there is a problem in that the efficiency of the insulated DC-DC converter while the vehicle is running is also lowered, and also the cost is easily increased.

In this regards, in the power source device 1 of this embodiment, the output voltage range of the insulated AC-DC converter 2 at the time of charging is the voltage range of the link voltage Vlink. In addition, the input voltage range of the insulated DC-DC converter 4 while the vehicle is running is also the voltage range of the link voltage Vlink. As described above, the voltage range of the link voltage Vlink can be narrower than that of the main battery 5. For this reason, in the power source device 1 of this embodiment, the output voltage range of the insulated AC-DC converter and the input voltage range of the insulated DC-DC converter can be narrower than that in the related art, and a high efficiency and a low cost can be achieved even at the time of charging and running.

Second Embodiment

Figure 4:
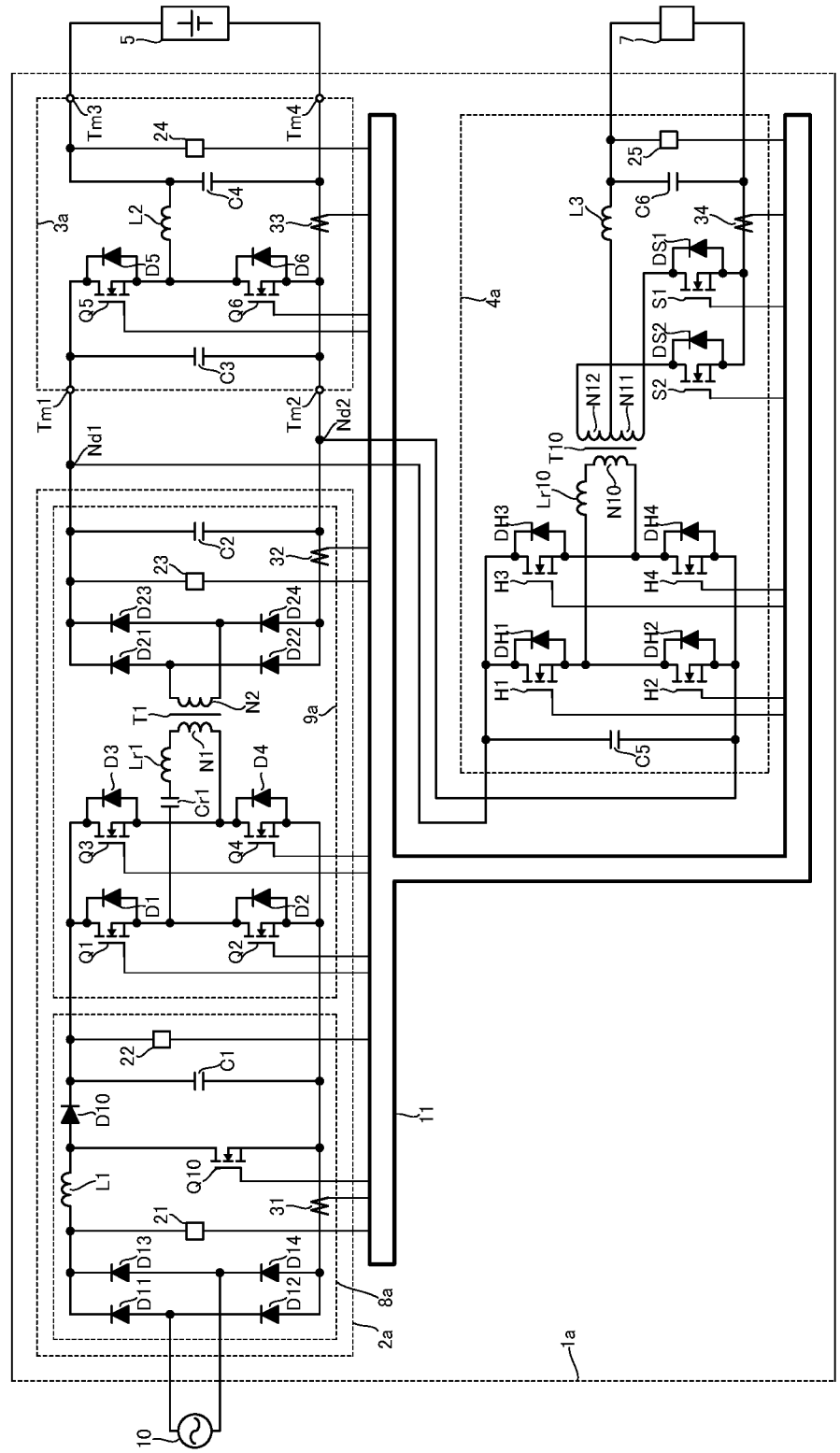
FIG. 4 is a circuit diagram illustrating a configuration of a power source device 1*a* according to a second embodiment.

FIG. 4 is a circuit diagram illustrating a configuration of a power source device 1a according to this embodiment. The power source device 1a includes an insulated AC-DC converter 2a which receives the power of the AC power source 10 and outputs the link voltage Vlink insulated from the AC power source 10 between nodes Nd1 and Nd2, a bidirectional DC-DC converter 3a which receives the link voltage Vlink to charge the main battery 5, an insulated DC-DC converter 4a which receives the link voltage Vlink to supply the power to the load 7, and a control unit 11 which controls these converters.

The insulated AC-DC converter 2a includes an AC-DC circuit 8a which receives the voltage of the AC power source 10 to output a DC voltage, and a DC-DC circuit 9a which receives the DC voltage output by the AC-DC circuit 8a to output the insulated link voltage Vlink.

In the AC-DC circuit 8a, the voltage of the AC power source 10 is full-wave rectified using diodes D11 to D14 which are connected in bridge. The full-wave rectified voltage is input to a boosting chopper circuit which is configured by a smoothing inductor L1, a switching element Q10, a diode D10, and a smoothing capacitor C1. The AC-DC circuit 8a outputs a DC voltage between both ends of the smoothing capacitor C1. The control unit 11 performs power factor improvement in which the input current from the AC power source 10 is controlled to be a sinusoidal waveform almost similar to the voltage of the AC power source 10.

The DC-DC circuit 9a includes a transformer T1 in which a winding N1 configured by a resonance capacitor Cr1 and a resonance inductor Lr1 connected in series and a winding N2 are magnetically combined. Herein, the resonance inductor Lr1 may not be provided in some cases, depending on a leakage inductance and a wiring inductance of the transformer T1.

A rectangular voltage is generated from the voltage input to the smoothing capacitor C1 using a switching circuit configured by full-bridged switching elements Q1 to Q4. The rectangular voltage is applied to a serial connection body of the resonance capacitor Cr1, the resonance inductor Lr1, and the winding N1 to cause a resonance current to flow to the winding N1. A current induced in the winding N2 is rectified by a rectification circuit configured by connecting diodes D21 to D24 in bridge, and smoothened by a smoothing capacitor C2. Then, the link voltage Vlink is output between the nodes Nd1 and Nd2. Further, diodes D1 to D4 are connected to the switching elements Q1 to Q4, respectively.

In this way, the DC-DC circuit 9a forms a resonance converter, and controls the output basically by changing switching frequencies of the switching elements Q1 to Q4.

The bidirectional DC-DC converter 3a includes a smoothing capacitor C3 connected between terminals Tm1 and Tm2, switching elements Q5 and Q6 connected in series between the terminals Tm1 and Tm2, and a smoothing inductor L2 and a smoothing capacitor C4 connected in series between both ends of the switching element Q6. Both ends of the smoothing capacitor C4 are used as the terminals Tm3 and Tm4. The link voltage Vlink is connected between the terminals Tm1 and Tm2, and the main battery 5 is connected between the terminals Tm3 and Tm4. Diodes D5 and D6 are connected to the switching elements Q5 and Q6 respectively.

The insulated DC-DC converter 4a inputs the link voltage Vlink between both ends of a smoothing capacitor C5 connected between the nodes Nd1 and Nd2, and supplies the power to the load 7 connected between both ends of a smoothing capacitor C6.

There is provided a transformer T10 in which a winding N10 connected in series with a resonance inductor Lr10 is magnetically combined with windings N11 and N12. Herein, the resonance inductor Lr10 may not be provided in some cases, depending on a leakage inductance and a wiring inductance of the transformer T10. A voltage is applied to the winding N10 using a voltage of the smoothing capacitor C5 from switching elements H1 to H4 connected in bridge. A voltage generated in the windings N11 and N12 is applied to a smoothing inductor L3 through diodes DS1 and DS2 to make the current flow. The voltage is smoothened by the smoothing capacitor C6 and output to the load 7. Further, diodes DH1 to DH4 are connected in parallel to the switching elements H1 to H4.

In a case where MOSFETs are used as switching elements S1 and S2 connected in anti-parallel to the diodes DS1 and DS2, it is possible to realize a synchronized rectification in which switching elements S1 and S2 go into an ON state during a period when the diodes DS1 and DS2 are conducted, so that the current of the diodes DS1 and DS2 is divided into the switching elements S1 and S2 to reduce a loss.

The diodes D1 to D6, DH1 to DH4, DS1, and DS2 are connected in anti-parallel to the switching elements Q1 to Q6, H1 to H4, S1, and S2. Herein, in a case where MOSFETs are used as the switching elements Q1 to Q6, H1 to H4, S1, and S2, parasitic diodes of the MOSFETs may be used as the diodes D1 to D6, DH1 to DH4, DS1, and DS2. In addition, two of the smoothing capacitors C2, C3, and C5 connected in parallel may be omitted in some cases.

The switching elements Q1 to Q6, H1 to H4, S1, and S2 are controlled by the control unit 11. The control unit 11 is connected to a voltage sensor 21 for detecting a full-wave rectified voltage of the AC power source 10, a voltage sensor 22 for detecting a DC voltage output from the AC-DC circuit 8a, a voltage sensor 23 for detecting the link voltage Vlink, a voltage sensor 24 for detecting a voltage of the smoothing capacitor C4 (that is, a voltage of the main battery 5), a voltage sensor 25 for detecting an output voltage of the insulated DC-DC converter 4a, a current sensor 31 for detecting a full-wave rectified current of the AC power source 10, a current sensor 32 for detecting an output current of the DC-DC circuit 9a, a current sensor 33 for detecting a current of the smoothing inductor L2 (that is, a current of the main battery 5), and a current sensor 34 for detecting an output current of the insulated DC-DC converter 4a.

As described above, the DC-DC circuit 9a forms a resonance converter, and controls the output basically by changing the switching frequencies of the switching elements Q1 to Q4 to adjust the magnitude of resonance current flowing in the windings N1 and N2. Specifically, a switching frequency is increased to lower the output voltage (reducing the output power), and on the contrary the switching frequency is lowered to increase the output voltage (increasing the output power). Therefore, there is a need to make a variation range of the switching frequency wide in order to widen the output voltage range. However, when the switching frequency is set to too high, the blocking current of the switching elements Q1 to Q4 is increased, and thus the switching loss is increased. In addition, when the switching frequency is set to too low, a peak value of the current flowing in the switching elements Q1 to Q4 and the windings N1 and N2 is increased, and thus the conduction loss may be increased. Therefore, when the output voltage range of the DC-DC circuit 9a (that is, the output voltage range of the insulated AC-DC converter 2a) is widened, the loss is increased and the efficiency is easily lowered.

In addition, the insulated DC-DC converter 4a controls the output by changing a time ratio (hereinafter, referred to as a duty) of a period when the switching element H1 (H2) and the switching element H4 (H3) both go into the ON state to adjust a time ratio of the voltage to be applied to the winding N10. The output voltage becomes large as the duty is increased. The duty is maximized when the switching element H1 (H2) and the switching element H4 (H3) are turned on and off at the same time. In a case where the input voltage of the insulated DC-DC converter 4a is lowered, it is possible to prevent the output voltage from being lowered by increasing the duty. However, when the input voltage is further lowered, a desired output power cannot be obtained even though the duty is maximized. In order to obtain a desired output power even on a condition that the input voltage is low, a winding ratio (the number of windings of the winding N11/the number of windings of the winding N10, the number of windings of the winding N12/the number of windings of the winding N10) of the transformer is set to be large. When the winding ratio is set to be large, a high voltage is generated in the windings N11 and N12 even at the time when the input voltage is low. Therefore, it is possible to easily obtain a large output power.

However, when the winding ratio is set to be large as described above, a higher voltage is generated in the windings N11 and N12 at the time when the input voltage becomes high. Therefore, the voltage applied to the switching elements S1 and S2 and the diodes DS1 and DS2 also becomes high, and elements having a high-withstanding voltage are required as the switching elements S1 and S2 and the diodes DS1 and DS2. In general, the loss also becomes large when the withstanding voltages of the switching element and the diode are increased. Therefore, when the input voltage range becomes wide, the insulated DC-DC converter 4a is increased in loss and thus the efficiency is easily lowered.

Herein, the power source device 1 of this embodiment includes the bidirectional DC-DC converter 3a, and the voltage range of the link voltage Vlink may be narrower than that of the main battery 5. In a case where the main battery 5 is charged from the AC power source 10, the bidirectional DC-DC converter 3a operates the switching element Q5 to output the power input from the terminals Tm1 and Tm2 to the terminals Tm3 and Tm4. In addition, in a case where the power is supplied from the main battery 5 to the load 7, the switching element Q6 is operated to output the power input from the terminals Tm3 and Tm4 to the terminals Tm1 and Tm2. At this time, the link voltage Vlink can be maintained at any voltage value (for example, almost a constant voltage) in a voltage range equal to or more than the voltage of the main battery 5 by controlling ON time ratios of the switching elements Q5 and Q6.

In addition, when the switching element Q5 is fixed to the ON state and the switching element Q6 to an OFF state, a through operation is called. The terminals Tm1 and Tm2 and the terminals Tm3 and Tm4 can be substantially short-circuited through the smoothing inductor L2 in a galvanic manner. When the through operation is performed, the link voltage Vlink can be maintained at almost the same voltage value as the voltage of the main battery 5 while preventing a switching loss and a core loss of the smoothing inductor L2 because the switching elements Q5 and Q6 are not operated.

The voltage range of the link voltage Vlink can be narrower than that of the main battery 5 by the bidirectional DC-DC converter 3a. Therefore, the output voltage range of the insulated AC-DC converter 2a in a case where the main battery 5 is charged from the AC power source 10 can be relatively narrow, so that the efficiency can be prevented from being lowered. In addition, the input voltage range of the insulated DC-DC converter 4a in a case where the power is supplied from the main battery 5 to the load 7 can be relatively narrow, so that the efficiency can be prevented from being lowered. Therefore, the power source device 1 of this embodiment can charge the main battery 5 from the AC power source 10 with a high efficiency. In addition, the power can be efficiently supplied from the main battery 5 to the load 7 with a high efficiency.

As described above, when the switching elements Q5 and Q6 of the bidirectional DC-DC converter 3a are operated, there occurs the switching loss and the core loss of the smoothing inductor L2. Therefore, on the contrary, the efficiency may be lowered when the link voltage Vlink is maintained at a constant voltage. In this case, the through operation may be performed in a case where the efficiency improvement (loss reduction) effect obtained by narrowing the voltage range of the link voltage Vlink is reduced by an efficiency reduction (loss increase) due to the operation of the switching elements Q5 and Q6.

Figure 5:
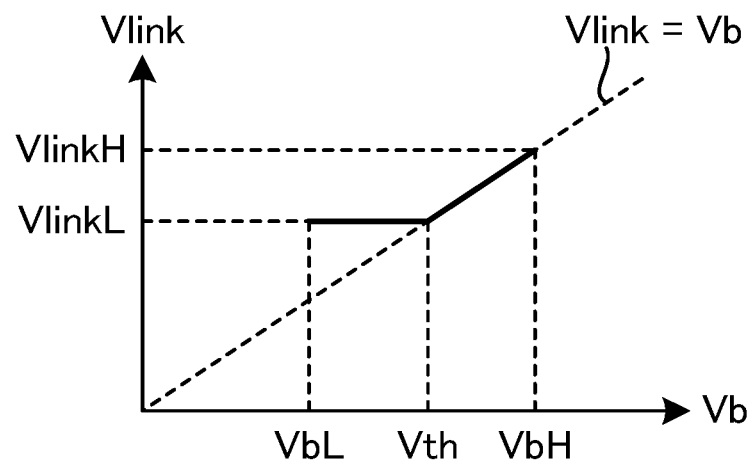
FIG. 5 is a diagram illustrating a relation between a voltage Vb of a main battery 5 and a link voltage Vlink according to the second embodiment.

As an example, FIG. 5 illustrates a relation between a voltage Vb of the main battery 5 and the link voltage Vlink. VbL represents a voltage lower limit of the main battery 5, and VbH represents a voltage upper limit of the main battery 5. Herein, in a case where the voltage Vb of the main battery 5 is equal to or less than a threshold value Vth, the bidirectional DC-DC converter 3a is operated to maintain the link voltage Vlink at a link voltage lower limit VlinkL. On the other hand, in a case where the voltage Vb of the main battery 5 is equal to or more than the threshold value Vth, the bidirectional DC-DC converter 3a is subjected to the through operation to set the link voltage Vlink to be substantially equal to the voltage Vb of the main battery 5 while suppressing the loss in the bidirectional DC-DC converter 3a. Through this operation, the voltage range of the link voltage Vlink is from the link voltage lower limit VlinkL (≈the threshold value Vth) to the link voltage upper limit VlinkH (≈the voltage upper limit VbH of the main battery 5), and becomes narrower than the voltage range of the main battery 5.

In FIG. 5, when the threshold value Vth is set to be high, the voltage range of the link voltage Vlink becomes narrow. Therefore, the loss in the insulated AC-DC converter 2a and the insulated DC-DC converter 4a is reduced. However, since a chance for the bidirectional DC-DC converter 3a to be subjected to the through operation is reduced, a chance to cause the loss in accordance with the switching operation of the bidirectional DC-DC converter 3a is increased. On the other hand, when the threshold value Vth is set to low, the voltage range of the link voltage Vlink becomes widened. Therefore, the loss in the insulated AC-DC converter 2a and the insulated DC-DC converter 4a is increased, but a chance for the bidirectional DC-DC converter 3a to be subjected to the through operation is increased. Accordingly, a chance to cause the loss in accordance with the switching operation of the bidirectional DC-DC converter 3a is reduced. In consideration of the above configuration, the threshold value Vth may be determined such that the entire loss in the power source device 1a becomes small.

Figure 6:
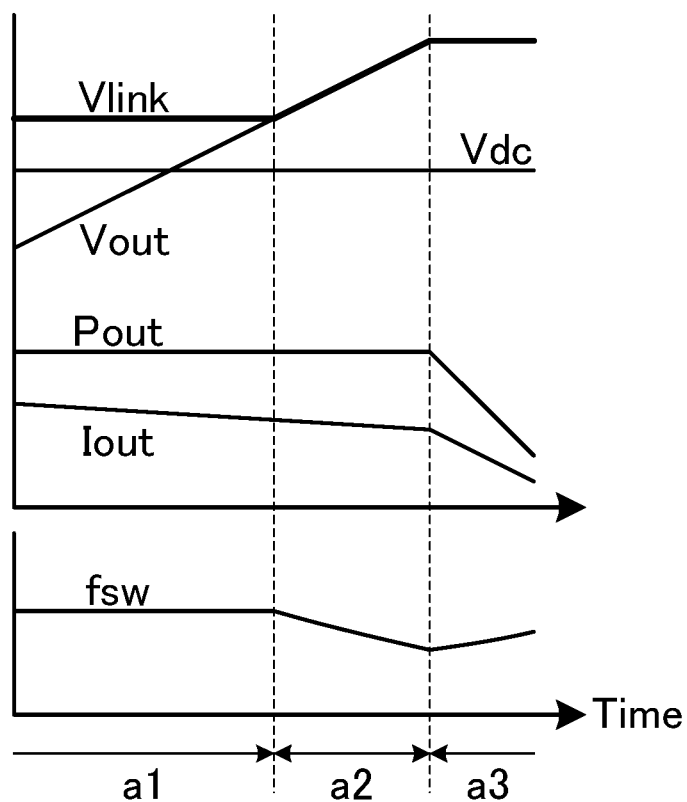
FIG. 6 is a diagram for describing an operation of the power source device 1*a* during a period when the main battery 5 according to the second embodiment is being charged.
Figure 7:
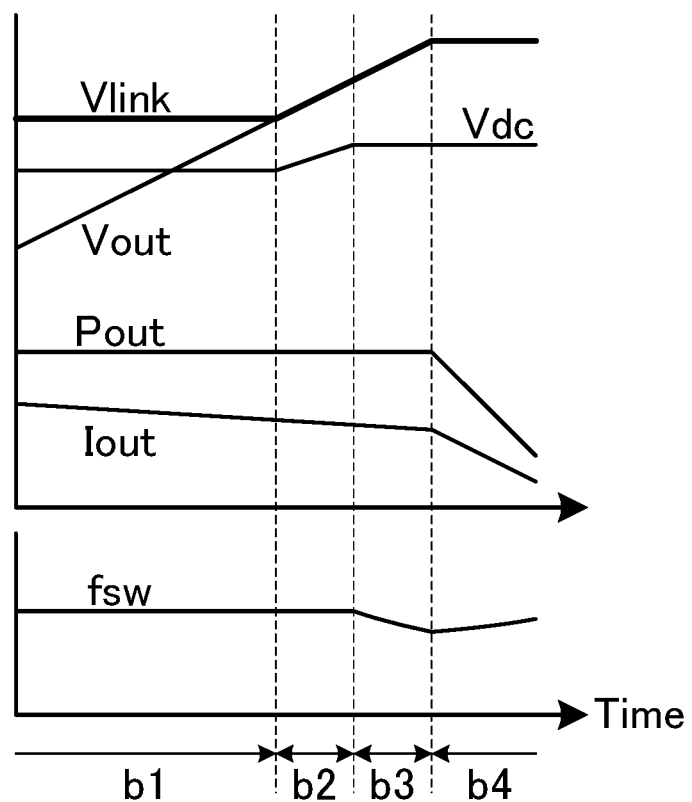
FIG. 7 is a diagram for describing an operation of the power source device 1*a* during a period when the main battery 5 according to the second embodiment is being charged.
Figure 8:
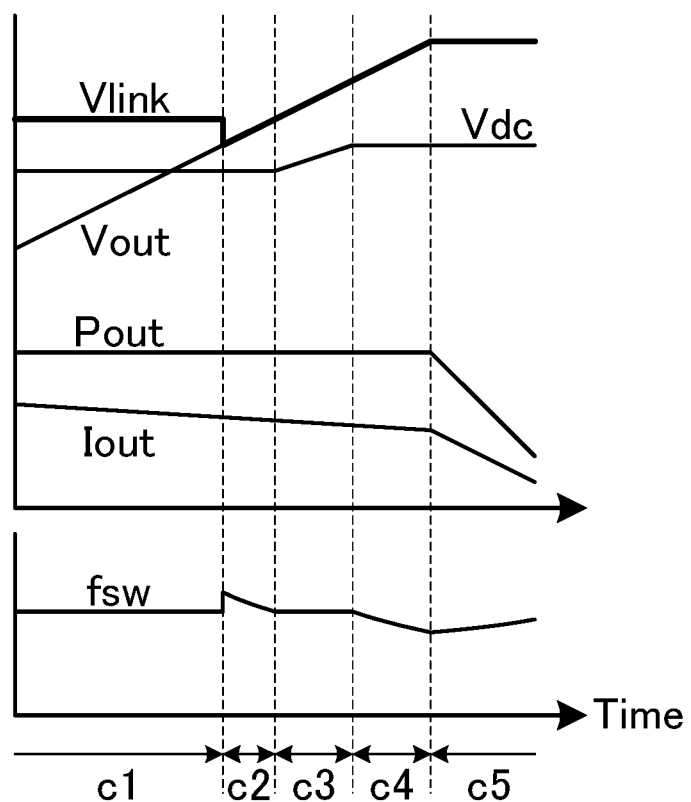
FIG. 8 is a diagram for describing an operation of the power source device 1*a* during a period when the main battery 5 according to the second embodiment is being charged.

FIGS. 6 to 8 illustrate changes in the link voltage Vlink in charging of the main battery 5, an output voltage (that is, the input voltage Vdc of the DC-DC circuit 9a) of the AC-DC circuit 8a, an output voltage Vout (≈the voltage of the main battery 5) between the terminals Tm3 and Tm4 of the bidirectional DC-DC converter 3a, an output voltage Pout, an output current Iout, and a time Time of a switching frequency fsw of the DC-DC circuit 9a.

In FIG. 6, the bidirectional DC-DC converter 3a is subjected to the switching operation in a period a1, the link voltage Vlink is maintained to be higher than the output voltage Vout, and the DC-DC circuit 9a can be operated with efficiency. A period a2 starts when the output voltage Vout is increased to reach the link voltage Vlink in accordance with the charge of the main battery 5. The bidirectional DC-DC converter 3a is switched from the switching operation to the through operation to suppress the loss of the bidirectional DC-DC converter 3a. Since the link voltage Vlink is also increased as the output voltage Vout is increased, the switching frequency fsw of the DC-DC circuit 9a is lowered. When the output voltage Vout reaches a charging end voltage, a period a3 starts. The output current Iout is lowered to maintain the output voltage Vout at the charging end voltage.

In this way, in the operation of FIG. 6, the link voltage Vlink is set to be higher than the voltage of the main battery 5 by causing the bidirectional DC-DC converter 3a to the switching operation in a case where the voltage of the main battery 5 is low, so that the DC-DC circuit 9a can be operated with a high efficiency. On the other hand, in a case where the voltage of the main battery 5 is high such that the DC-DC circuit 9a can be operated with a relatively-high efficiency, the bidirectional DC-DC converter 3a is subjected to the through operation, so that the loss of the bidirectional DC-DC converter 3a is suppressed.

In FIG. 7, the operation in a period b1 is similar to that in the period a1 of FIG. 6. When it comes to a period b2, the bidirectional DC-DC converter 3a is switched from the switching operation to the through operation to suppress the loss, and the switching frequency fsw of the DC-DC circuit 9a is suppressed from being lowered by increasing the input voltage Vdc of the DC-DC circuit 9a as the link voltage Vlink is increased. When the increase of the input voltage Vdc of the DC-DC circuit 9a is ended, a period b3 starts, the switching frequency fsw of the DC-DC circuit 9a is increased as the link voltage Vlink is increased. The operation in a period b4 is similar to that in the period a3 of FIG. 6. The reduction of the switching frequency fsw of the DC-DC circuit 9a becomes small by a magnitude of the input voltage Vdc of the DC-DC circuit 9a.

In this way, in the operation of FIG. 7, there are provided a period when the link voltage Vlink is increased and the input voltage Vdc of the DC-DC circuit 9a is increased during a period when the bidirectional DC-DC converter 3a is subjected to the through operation in addition to the operation of FIG. 6. Therefore, the reduction of the switching frequency fsw of the DC-DC circuit 9a is suppressed, and the loss in the DC-DC circuit 9a is reduced still more.

In FIG. 8, the operation in a period c1 is similar to that in the period a1 of FIG. 6. The link voltage Vlink in the period c1 is determined such that a total efficiency of the DC-DC circuit 9a and the bidirectional DC-DC converter 3a becomes high. However, the bidirectional DC-DC converter 3a is subjected to the through operation so as to transition to a period c2 before the output voltage Vout reaches the link voltage Vlink in a case where the output voltage Vout increases and the influence of the efficiency reduction of the DC-DC circuit 9a due to the increase of the switching frequency fsw of the DC-DC circuit 9a when the link voltage Vlink is reduced down to the output voltage Vout becomes smaller than that of the efficiency improvement due to the through operation of the bidirectional DC-DC converter 3a. The operations in periods c3 to c5 are similar to those in the periods b2 to b4 of FIG. 7.

In this way, in the operation of FIG. 8, in addition to the operation of FIG. 7, the total efficiency of the DC-DC circuit 9a and the bidirectional DC-DC converter 3a is increased still more by the through operation of the bidirectional DC-DC converter 3a before the output voltage Vout reaches the link voltage Vlink.

Further, in FIG. 7, when a time slope to increase the input voltage Vdc of the DC-DC circuit 9a in the period b2 is increased, the efficiency may be increased in a case where the input voltage Vdc of the DC-DC circuit 9a is increased and also the switching frequency fsw of the DC-DC circuit 9a is gradually lowered. In addition, in a case where the switching frequency fsw of the DC-DC circuit 9a is too increased in order to reduce the output current Iout in the period b4, the efficiency may be increased in a case where the input voltage Vdc of the DC-DC circuit 9a is lowered. The situation is the same as that in FIG. 8.

Third Embodiment

Figure 9:
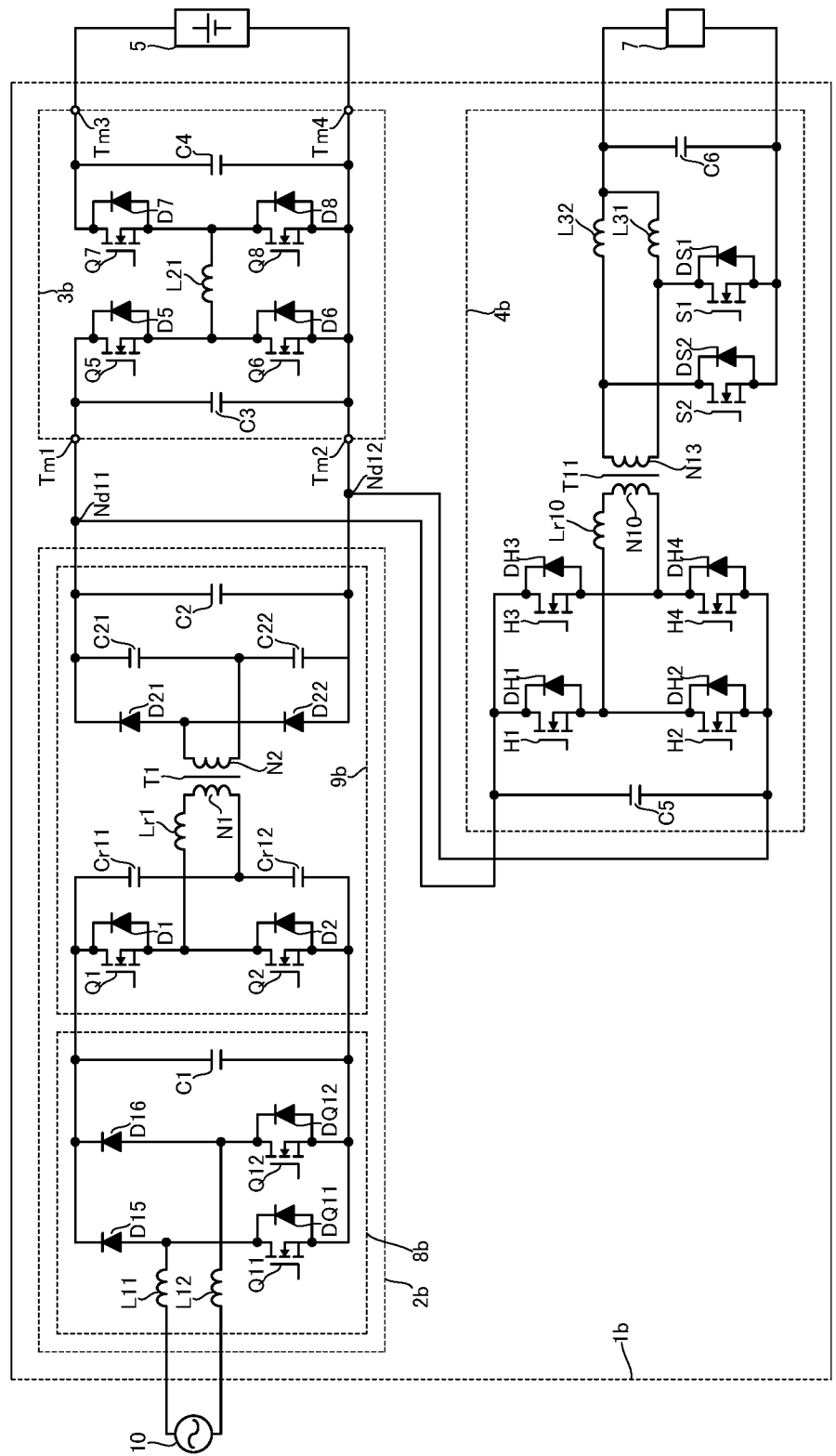
FIG. 9 is a circuit diagram illustrating a configuration of a power source device 1*b* according to a third embodiment.

FIG. 9 is a circuit diagram illustrating a configuration of a power source device 1b according to this embodiment. The power source device 1b includes an insulated AC-DC converter 2b which receives the power of the AC power source 10 and outputs the link voltage Vlink insulated from the AC power source 10 between nodes Nd11 and Nd12, a bidirectional DC-DC converter 3b which receives the link voltage Vlink to charge the main battery 5, and an insulated DC-DC converter 4b which receives the link voltage Vlink to supply the power to the load 7. The insulated AC-DC converter 2b includes an AC-DC circuit 8b which receives the voltage of the AC power source 10 to output a DC voltage, and a DC-DC circuit 9b which receives the DC voltage output by the AC-DC circuit 8b to output an insulated link voltage Vlink.

In the AC-DC circuit 8b, there are provided a diode D15 and a switching element Q11 which are connected in series to one end of a smoothing inductor L11 between both ends of the smoothing capacitor C1, and a diode D16 and a switching element Q12 which are connected in series to one end of a smoothing inductor L12 between both ends of the smoothing capacitor C1. The AC-DC circuit is configured by a bridgeless circuit which receives a current from the AC power source 10 between the other end of the smoothing inductor L11 and the other end of the smoothing inductor L12, and outputs the DC voltage between both ends of the smoothing capacitor C1. The AC-DC circuit 8b of the bridgeless circuit has a merit on having a high efficiency compared to the AC-DC circuit 8a according to second embodiment.

The DC-DC circuit 9b is different from the DC-DC circuit 9a according to the second embodiment, in that the resonance capacitor Cr1 is configured by resonance capacitors Cr11 and Cr12, a half bridge circuit, which is obtained by replacing the switching elements Q3 and Q4 and the anti-parallel diodes D3 and D4 among the switching elements Q1 to Q4 equipped with the anti-parallel diodes D1 to D4 connected in bridge using the resonance capacitors Cr11 and Cr12, and in that the diodes D23 and D24 among the diodes D21 to D24 connected in bridge are replaced with smoothing capacitors C21 and C22 respectively. The link voltage Vlink is output between the nodes Nd11 and Nd12. The DC-DC circuit 9b is easily simplified compared to the DC-DC circuit 9a in which the full-bridge circuit according to the second embodiment is employed.

The bidirectional DC-DC converter 3b includes the smoothing capacitor C3 which is connected between the terminals Tm1 and Tm2, the switching elements Q5 and Q6 which are connected in series between the terminals Tm1 and Tm2, a smoothing inductor L21 and a switching element Q8 which are connected in series between both ends of the switching element Q6, and a switching element Q7 and the smoothing capacitor C4 which are connected in series between both ends of the switching element Q8. Both ends of the smoothing capacitor C4 are used as the terminals Tm3 and Tm4. The link voltage Vlink is connected between the terminals Tm1 and Tm2, and the main battery 5 is connected between the terminals Tm3 and Tm4.

The bidirectional DC-DC converter 3b is configured by an H bridge circuit, and the link voltage Vlink can be controlled to be any voltage regardless of a magnitude relation between the link voltage Vlink and the voltage of the main battery 5. Of course, when the switching elements Q5 and Q7 are fixed to the ON state and the switching elements Q6 and Q8 to the OFF state, the through operation can be performed similarly to the bidirectional DC-DC converter 3a according to the second embodiment.

The insulated DC-DC converter 4b inputs the link voltage Vlink between both ends of the smoothing capacitor C5 connected between the nodes Nd11 and Nd12, and supplies the power to the load 7 connected between both ends of the smoothing capacitor C6. There is provided a transformer T11 which magnetically combines the winding N10 connected to the resonance inductor Lr10 in series and a winding N13. The voltage is applied to the winding N10 using the voltage of the smoothing capacitor C5 by the switching elements H1 to H4 connected in bridge, the voltage generated in the winding N13 is applied to smoothing inductors L32 and L31 through the diodes DS1 and DS2 to cause the current to flow, and the voltage is smoothened by the smoothing capacitor C6 to be output to the load 7. The synchronized rectification can be performed in a case where the MOSFETs are used as the switching elements S1 and S2 respectively connected in anti-parallel to the diodes DS1 and DS2. The insulated DC-DC converter 4b can reduce the number of windings compared to the insulated DC-DC converter 4a according to the second embodiment.

The diodes D1, D2, D5 to D8, DQ11, DQ12, DH1 to DH4, DS1, and DS2 are connected in anti-parallel to the switching elements Q1, Q2, Q5 to Q8, Q11, Q12, H1 to H4, S1, and S2 respectively.

Figure 10:
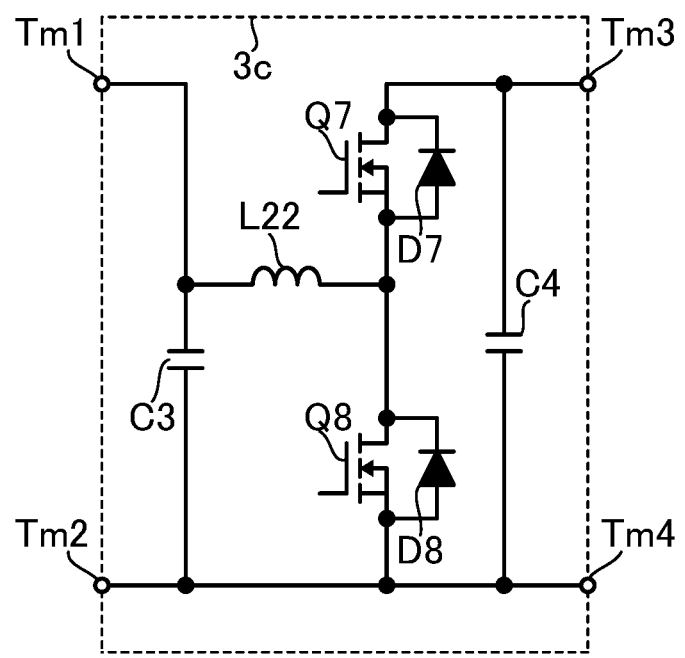
FIG. 10 is a circuit diagram illustrating a configuration of a bidirectional converter 3*c* according to the third embodiment.

Further, in a case where the voltage of the main battery 5 is higher than the link voltage Vlink, the bidirectional DC-DC converter 3b can be replaced with a bidirectional DC-DC converter 3c illustrated in FIG. 10. The bidirectional DC-DC converter 3c includes the smoothing capacitor C3 which is connected between the terminals Tm1 and Tm2, a smoothing inductor L22 and the switching element Q8 which are connected in series between the terminals Tm1 and Tm2, and the switching elements Q7 and the smoothing capacitor C4 which are connected in series between both ends of the switching element Q8. Both ends of the smoothing capacitor C4 are used as the terminals Tm3 and Tm4.

The bidirectional DC-DC converter 3c can simplify the configuration and handle a high voltage of the main battery 5 compared to the bidirectional DC-DC converter 3b. Of course, when the switching element Q7 is fixed to the ON state and the switching element Q8 to the OFF state, the through operation can be performed.

Hitherto, as described in the first to third embodiments, the power source device of each embodiment includes the bidirectional DC-DC converter between the DC link voltage and the main battery. In a case where the power is supplied from the main battery to the load, the link voltage having a voltage range narrower than that of the main battery is generated and supplied to the insulated DC-DC converter. At this time, there is no need for the power source device of this embodiment to necessarily include the insulated DC-DC converter. For example, the power source device of this embodiment may include a terminal to be capable of outputting the link voltage.

REFERENCE SIGNS LIST 1, 1a, 1b power source device
2, 2a, 2b insulated AC-DC converter
3, 3a, 3b, 3c bidirectional DC-DC converter
4, 4a, 4b insulated DC-DC converter
8a, 8b AC-DC circuit
9a, 9b DC-DC circuit
5 main battery
6 low-voltage battery
7 load
10 AC power source
11 control unit
21, 22, 23, 24, 25 voltage sensor
31, 32, 33, 34 current sensor
100 electric vehicle
101 charging connector
102 converter
103 inverter
104 drive motor
Vlink link voltage
Q1 to Q8, Q10 to Q12, H1 to H4, S1, S2 switching element
D1 to D8, D10 to D16, D21 to D24, DQ11, DQ12, DH1 to DH4, DS1, DS2 diodes
C1 to C6 smoothing capacitor
L1 to L3, L11, L12, L21, L22, L31, L32 smoothing inductor
Cr1, Cr11, Cr12 resonance capacitor
Lr1, Lr10 resonance inductor
T1, T10, T11 transformer
N1, N2, N10 to N13 winding
Tm1 to Tm4 terminal
Nd1, Nd2, Nd11, Nd12 node

The invention claimed is:

1. A power source device, comprising:
an insulated AC-DC converter configured to receive an AC voltage and output a DC link voltage to a bidirectional DC-DC converter; and
the bidirectional DC-DC converter, which is configured to:
receive the link voltage from a first direction, and use the link voltage to charge a battery;
receive power from the battery; and
selectively output the link voltage in a second direction opposite to the first direction,
wherein the bidirectional DC-DC converter is configured to output the link voltage having a constant first value when a voltage of the battery is at or below a threshold, and to output the link voltage having a second value higher than the first value when a voltage of the battery is above the threshold.

2. The power source device according to claim 1, wherein using the link voltage to charge the battery comprises outputting the link voltage to the battery.

3. The power source device according to claim 1, further comprising:
an insulated DC-DC converter configured to receive the link voltage to supply the power to a load.

4. The power source device according to claim 3, the power source configured to:
implement a first operation mode in which the power is supplied from the AC voltage to the battery; and
implement a second operation mode in which the power is supplied from the battery to the load.

5. The power source device according to claim 4, the power source configured to:
implement a third operation mode in which the power is supplied from the AC voltage to the battery and the load.

6. The power source device according to claim 1, wherein a voltage range of voltage supplied by the battery is wider than an operation range of the link voltage when the bidirectional DC-DC converter steadily receives or outputs the power.

7. The power source device according to claim 1, wherein the bidirectional DC-DC converter comprises a switching element, first terminals, and second terminals, and is configured such that when the link voltage is connected between the first terminals, and the battery is connected between the second terminals, the switching element of the bidirectional DC-DC converter enters an ON state to short-circuit the first terminals and the second terminals in a galvanic manner.

8. The power source device according to claim 7, wherein the bidirectional DC-DC converter includes a first switching element and a second switching element that are connected in series between the first terminals, and a smoothing inductor and a smoothing capacitor that are connected in series between both ends of the second switching element, and
wherein both ends of the smoothing capacitor are the second terminals.

9. The power source device according to claim 7, wherein the bidirectional DC-DC converter includes a smoothing inductor and a first switching element that are connected in series between the first terminals, and a second switching element and a smoothing capacitor that are connected in series between both ends of the first switching element, and
wherein both ends of the smoothing capacitor are used as the second terminals.

10. The power source device according to claim 7, wherein the bidirectional DC-DC converter includes a first switching element and a second switching element that are connected in series between the first terminals, a smoothing inductor and a third switching element that are connected in series between both ends of the second switching element, and a fourth switching element and a smoothing capacitor that are connected in series between both ends of the third switching element, and
wherein both ends of the smoothing capacitor are used as the second terminals.

11. The power source device according to claim 1, wherein the insulated AC-DC converter includes an AC-DC circuit configured to receive the AC voltage and configured to output a DC voltage, and a DC-DC circuit configured to receive the DC voltage output by the AC-DC circuit and configured to output the link voltage, and
wherein the DC-DC circuit is configured to insulate an input and an output of the DC-DC circuit.

12. The power source device according to claim 11, wherein the DC-DC circuit comprises a resonance converter including a switching circuit configured to receive the DC voltage output by the AC-DC circuit and to output a rectangular voltage to cause a current to flow in a primary winding, a rectification circuit configured to receive and rectify a current of a secondary winding and to output the link voltage, a transformer configured to magnetically combine the primary winding and the secondary winding, and a resonance capacitor and a resonance inductor that are connected in series to the primary winding and/or the secondary winding.

13. A power source device, comprising:

an insulated AC-DC converter configured to receive an AC voltage and output a DC link voltage;

a bidirectional DC-DC converter configured to:
  receive the link voltage and charge a battery using the link voltage; and
  receive power from the battery and selectively output the link voltage using the power; and an insulated DC-DC converter configured to receive the link voltage from the bidirectional DC-DC converter and to supply the power to a load, wherein an operation range of the link voltage when the bidirectional DC-DC converter steadily receives or outputs the power is narrower than a voltage range of the battery, and, wherein the bidirectional DC-DC converter is configured to output the link voltage having a constant first value when a voltage of the battery is at or below a threshold, and to output the link voltage having a second value higher than the first value when a voltage of the battery is above the threshold.

14. The power source device according to claim 13, the power source configured to:
  implement a first operation mode in which the power is supplied from the AC voltage to the battery; and
  implement a second operation mode in which the power is supplied from the battery to the load.

15. The power source device according to claim 14, the power source configured to:
  implement a third operation mode in which the power is supplied from the AC voltage to the battery and the load.

16. The power source device according to claim 14,
wherein the bidirectional DC-DC converter comprises a switching element, first terminals, and second terminals, and is configured such that when the link voltage is connected between first terminals, and the battery is connected between second terminals, the switching element of the bidirectional DC-DC converter enters an ON state to short-circuit the first terminals and the second terminals in a galvanic manner.

17. The power source device according to claim 16,
wherein the bidirectional DC-DC converter includes a first switching element and a second switching element that are connected in series between the first terminals, and a smoothing inductor and a smoothing capacitor that are connected in series between both ends of the second switching element, and
wherein both ends of the smoothing capacitor are the second terminals.

18. The power source device according to claim 16,
wherein the bidirectional DC-DC converter includes a smoothing inductor and a first switching element that are connected in series between the first terminals, and a second switching element and a smoothing capacitor that are connected in series between both ends of the first switching element, and
wherein both ends of the smoothing capacitor are the second terminals.

19. The power source device according to claim 16,
wherein the bidirectional DC-DC converter includes a first switching element and a second switching element that are connected in series between the first terminals, a smoothing inductor and a third switching element that are connected in series between both ends of the second switching element, and a fourth switching element and a smoothing capacitor that are connected in series between both ends of the third switching element, and
wherein both ends of the smoothing capacitor are the second terminals.

20. The power source device according to claim 1,
wherein the bidirectional DC-DC converter is configured to output the link voltage having a value that ramps up from the first value to the second value when the voltage of the battery is above the threshold.

* * * * *